US008918903B1

(12) United States Patent
Schepis et al.

(10) Patent No.: US 8,918,903 B1
(45) Date of Patent: Dec. 23, 2014

(54) SYSTEMS AND METHODS FOR PERFORMING AUTHENTICATION VALIDATION

(75) Inventors: Adam Schepis, Milford, MA (US); Andrew Caola, West Boylston, MA (US)

(73) Assignee: Symantec Corporation, Mountain View, CA (US)

( * ) Notice: Subject to any disclaimer, the term of this patent is extended or adjusted under 35 U.S.C. 154(b) by 104 days.

(21) Appl. No.: 13/291,735

(22) Filed: Nov. 8, 2011

(51) Int. Cl.
H04L 29/06 (2006.01)

(52) U.S. Cl.
USPC .............. 726/28; 726/26; 726/27; 709/224; 709/225

(58) Field of Classification Search
USPC .................... 726/26, 27, 28; 709/224, 225
See application file for complete search history.

(56) References Cited

U.S. PATENT DOCUMENTS

| | | | | |
|---|---|---|---|---|
| 7,260,837 | B2 * | 8/2007 | Abraham et al. | 726/4 |
| 7,509,686 | B2 * | 3/2009 | Checco | 726/27 |
| 7,640,336 | B1 * | 12/2009 | Lu et al. | 709/224 |
| 7,904,554 | B1 * | 3/2011 | Lu et al. | 709/224 |
| 7,941,525 | B1 * | 5/2011 | Yavilevich | 709/224 |
| 8,069,076 | B2 * | 11/2011 | Oddo | 705/7.29 |
| 8,122,137 | B2 * | 2/2012 | Appelman et al. | 709/229 |
| 8,255,514 | B2 * | 8/2012 | DeHaas et al. | 709/224 |
| 8,281,005 | B2 * | 10/2012 | Vanderhook et al. | 709/224 |
| 8,281,361 | B1 * | 10/2012 | Schepis et al. | 726/1 |
| 8,468,578 | B1 * | 6/2013 | Lu et al. | 726/2 |
| 8,578,453 | B2 * | 11/2013 | Roach | 726/4 |
| 2002/0049806 | A1 * | 4/2002 | Gatz et al. | 709/203 |
| 2002/0178257 | A1 * | 11/2002 | Cerrato | 709/224 |
| 2006/0242424 | A1 * | 10/2006 | Kitchens et al. | 713/183 |
| 2006/0271669 | A1 * | 11/2006 | Bouguenon et al. | 709/224 |
| 2007/0088820 | A1 * | 4/2007 | Kwak et al. | 709/224 |
| 2008/0005325 | A1 * | 1/2008 | Wynn et al. | 709/225 |
| 2009/0210516 | A1 * | 8/2009 | Roskowski | 709/219 |
| 2009/0254656 | A1 * | 10/2009 | Vignisson et al. | 709/224 |
| 2009/0265460 | A1 * | 10/2009 | Balasubramanian et al. | 709/224 |
| 2009/0327482 | A1 * | 12/2009 | Malhotra et al. | 709/224 |
| 2010/0058446 | A1 * | 3/2010 | Thwaites | 726/4 |

(Continued)

FOREIGN PATENT DOCUMENTS

EP 1120722 A2 * 8/2001

OTHER PUBLICATIONS

Elsheikh, Selma; "Access Control Scheme for Web Services (ACSWS)", International Conference on Computer and Communication Engineering, May 13-15, 2008, pp. 854-858.*

*Primary Examiner* — Victor Lesniewski
(74) *Attorney, Agent, or Firm* — ALG Intellectual Property, LLC

(57) ABSTRACT

A method may include identifying a computer-usage trend of a first user that reflects a history of computer-related activities engaged in by the first user. The computer usage trend may indicate at least one software program and/or website accessed by the user. The method may also include determining that a current user is logged into a computing system under a user account of the first user. The method may further include tracking activities of the current user while the current user is logged into the computing system as the first user, comparing the tracked activities of the current user with the computer-usage trend of the first user, and determining that the tracked activities of the current user do not correspond to the computer-usage trend of the first user. The method may additionally include, performing at least one remedial action. Various other methods, systems, and computer-readable media are also disclosed.

20 Claims, 5 Drawing Sheets

(56) References Cited

U.S. PATENT DOCUMENTS

| | | | |
|---|---|---|---|
| 2010/0088152 A1* | 4/2010 | Bennett | 705/10 |
| 2010/0211884 A1* | 8/2010 | Kashyap et al. | 715/745 |
| 2010/0235923 A1* | 9/2010 | Schepis et al. | 726/26 |
| 2011/0023113 A1* | 1/2011 | Munyon et al. | 726/19 |
| 2011/0137904 A1* | 6/2011 | Rajaram et al. | 707/740 |
| 2011/0208857 A1* | 8/2011 | Gentile et al. | 709/224 |
| 2011/0219115 A1* | 9/2011 | Capel et al. | 709/224 |
| 2011/0270971 A1* | 11/2011 | Abraham et al. | 709/224 |
| 2012/0036259 A1* | 2/2012 | Minnis et al. | 709/224 |
| 2012/0173699 A1* | 7/2012 | Niemela | 709/224 |
| 2012/0235790 A1* | 9/2012 | Zhao et al. | 340/5.83 |
| 2012/0297477 A1* | 11/2012 | Raviv | 726/22 |
| 2012/0303552 A1* | 11/2012 | Zayas et al. | 705/400 |
| 2013/0036458 A1* | 2/2013 | Liberman et al. | 726/6 |

* cited by examiner

SYSTEMS AND METHODS FOR PERFORMING AUTHENTICATION VALIDATION

BACKGROUND

Parents may set up individual accounts with individualized parental controls for each of their children to enable their children to authenticate to a computing system and be protected and restricted from inappropriate activities and content. Unfortunately, children often circumvent traditional parental-control mechanisms by authenticating as a different user (e.g., a sibling, a parent, a friend, etc.) or otherwise accessing a different user's account without permission (e.g., by accessing another person's account if the person fails to log out). When a child is accessing a computing system under a different user's account, the child may not be bound by the same policies and rules that restrict the child under his or her own account. In such situations, a child may be exposed to inappropriate content and/or may participate in activities that are restricted within the child's own account. What is needed, therefore, is a more efficient and effective mechanism for validating authentication of children and other users who may attempt to circumvent traditional authentication and control mechanisms.

SUMMARY

As will be described in greater detail below, the instant disclosure generally relates to systems and methods for performing authentication validation. In one example, a computer-implemented method for performing authentication validation may include 1) identifying a computer-usage trend of a first user that reflects a history of computer-related activities engaged in by the first user, 2) determining that a current user is logged into a computing system under a user account of the first user, 3) tracking activities of the current user while the current user is logged into the computing system as the first user, 4) comparing the tracked activities of the current user with the computer-usage trend of the first user, 5) determining that the tracked activities of the current user do not correspond to the computer-usage trend of the first user, 6) in response to determining that the tracked activities of the current user do not correspond to the computer-usage trend of the first user, performing at least one remedial action.

In certain embodiments, the method may include identifying a computer-usage trend of a second user that reflects a history of computer-related activities engaged in by the second user. In such embodiments, the method may include comparing the tracked activities of the current user with the computer-usage trend of the second user, where determining that the tracked activities of the current user do not correspond to the computer-usage trend of the first user includes determining that the tracked activities of the current user correspond more closely to the computer-usage trend of the second user than the computer-usage trend of the first user.

According to various embodiments, before the remedial action is performed, the tracked activities of the current user are associated with the user account of the first user. In such embodiments, performing the remedial action may include automatically disassociating the tracked activities of the current user from the user account of the first user and associating the tracked activities of the current user with a user account of the second user.

Furthermore, identifying the computer-usage trend of the first user may include tracking activities of the first user while the first user is logged into the first user account and analyzing the tracked activities of first user account to create the computer-usage trend of the first user, and identifying the computer-usage trend of the second user may include tracking activities of the second user while the second user is logged into the second user account and analyzing the tracked activities of second user account to create the computer-usage trend of the second user. Additionally or alternatively, associating the tracked activities of the current user with the user account of the second user may include analyzing the tracked activities of the current user and updating the computer-usage trend of the second user to reflect the tracked activities of the current user.

According to certain embodiments, determining that the tracked activities of the current user correspond more closely to the computer-usage trend of the second user than the computer-usage trend of the first user may include determining that the tracked activities of the current user correspond to activities that are often engaged in by the second user and are not often engaged in by the first user.

In some examples, before the remedial action is performed, a set of parental controls associated with the first user are applied to activities of the current user and performing the remedial action includes switching from applying the set of parental controls associated with the first user to applying a set of parental controls associated with the second user to activities of the current user.

In various embodiments, determining that the tracked activities of the current user do not correspond to the computer-usage trend of the first user may include determining a distance between the computer-usage trend of the first user and the tracked activities of the current user and determining that the distance is greater than a predetermined threshold.

According to certain embodiments, performing the remedial action may include prompting an administrator to review the tracked activities of the current user and determine whether the activities of the current user should be associated with someone other than the first user. Additionally or alternatively, performing the remedial action may include automatically logging the current user out of the account of the first user.

In one embodiment, a system for implementing the above-described method may include 1) an identification module programmed to identify a computer-usage trend of a first user that reflects a history of computer-related activities engaged in by the first user, 2) an authentication module programmed to determine that a current user is logged into a computing system under a user account of the first user, 3) a tracking module programmed to track activities of the current user while the current user is logged into the computing system as the first user, 4) a comparison module programmed to compare the tracked activities of the current user with the computer-usage trend of the first user, 5) a determination module programmed to determine that the tracked activities of the current user do not correspond to the computer-usage trend of the first user, 6) a remediation module programmed to, in response to determining that the tracked activities of the current user do not correspond to the computer-usage trend of the first user, perform at least one remedial action, and 7) at least one processor configured to execute the identification module, the authentication module, the tracking module, the comparison module, the determination module, and the remediation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a computer-usage trend of a first user that reflects a history of computer-related activities engaged in by the first user, 2) determine that a current user is logged into a computing system under a user account of the first user, 3) track activities of the current user while the current user is logged into the computing system as the first user, 4) compare the tracked activities of the current user with the computer-usage trend of the first user, 5) determine that the tracked activities of the current user do not correspond to the computer-usage trend of the first user, and 6) in response to determining that the tracked activities of the current user do not correspond to the computer-usage trend of the first user, perform at least one remedial action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
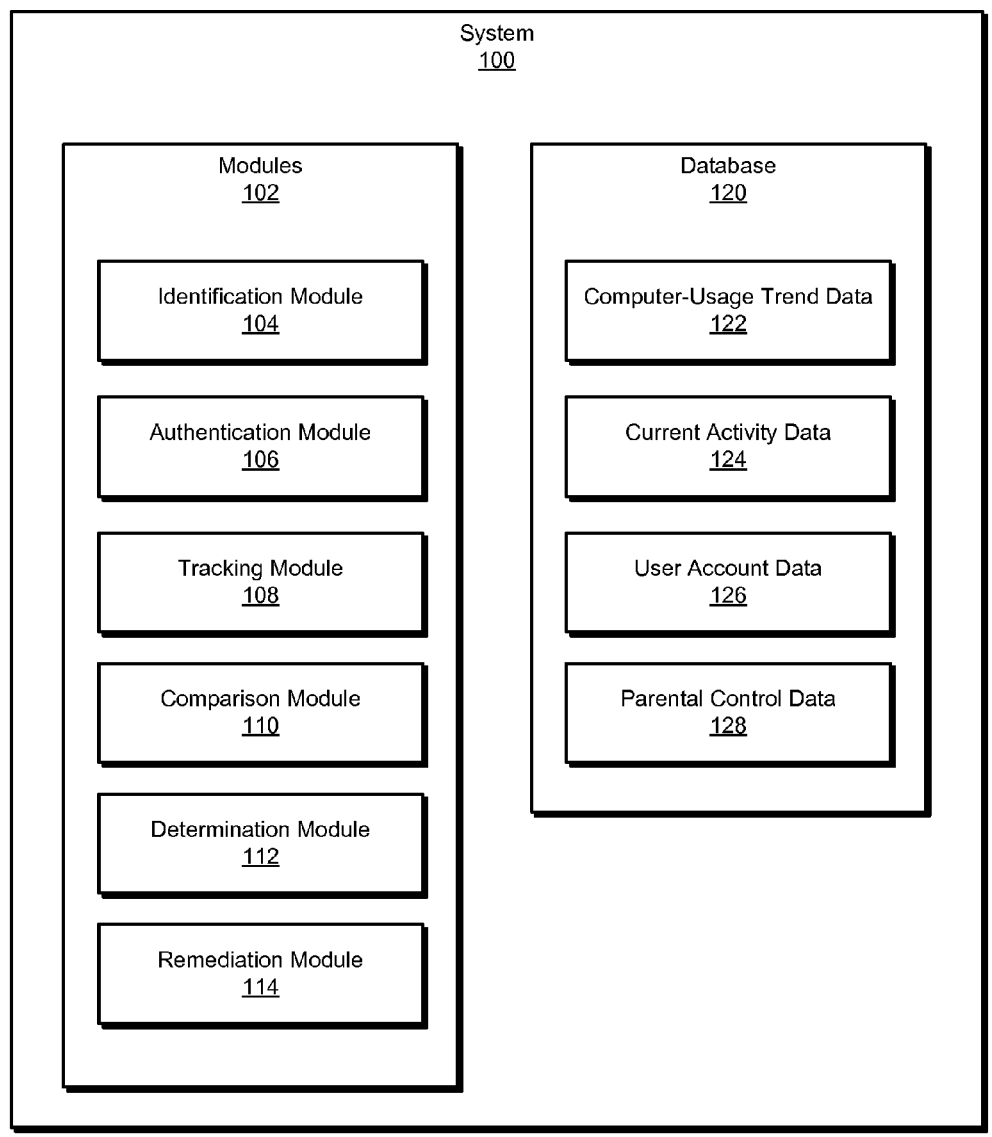
FIG. 1 is a block diagram of an exemplary system for performing authentication validation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Systems and methods of the instant disclosure may identify computer-usage trends of users by storing and/or analyzing historical computer-usage information for users. Such systems and methods may use computer-usage trends of users to determine when a user may be using someone else's account. In this manner, the systems and methods presented herein may validate user authentication, enforce appropriate parental controls, correctly report activities of users, and/or provide various other features and advantages.

Figure 2:
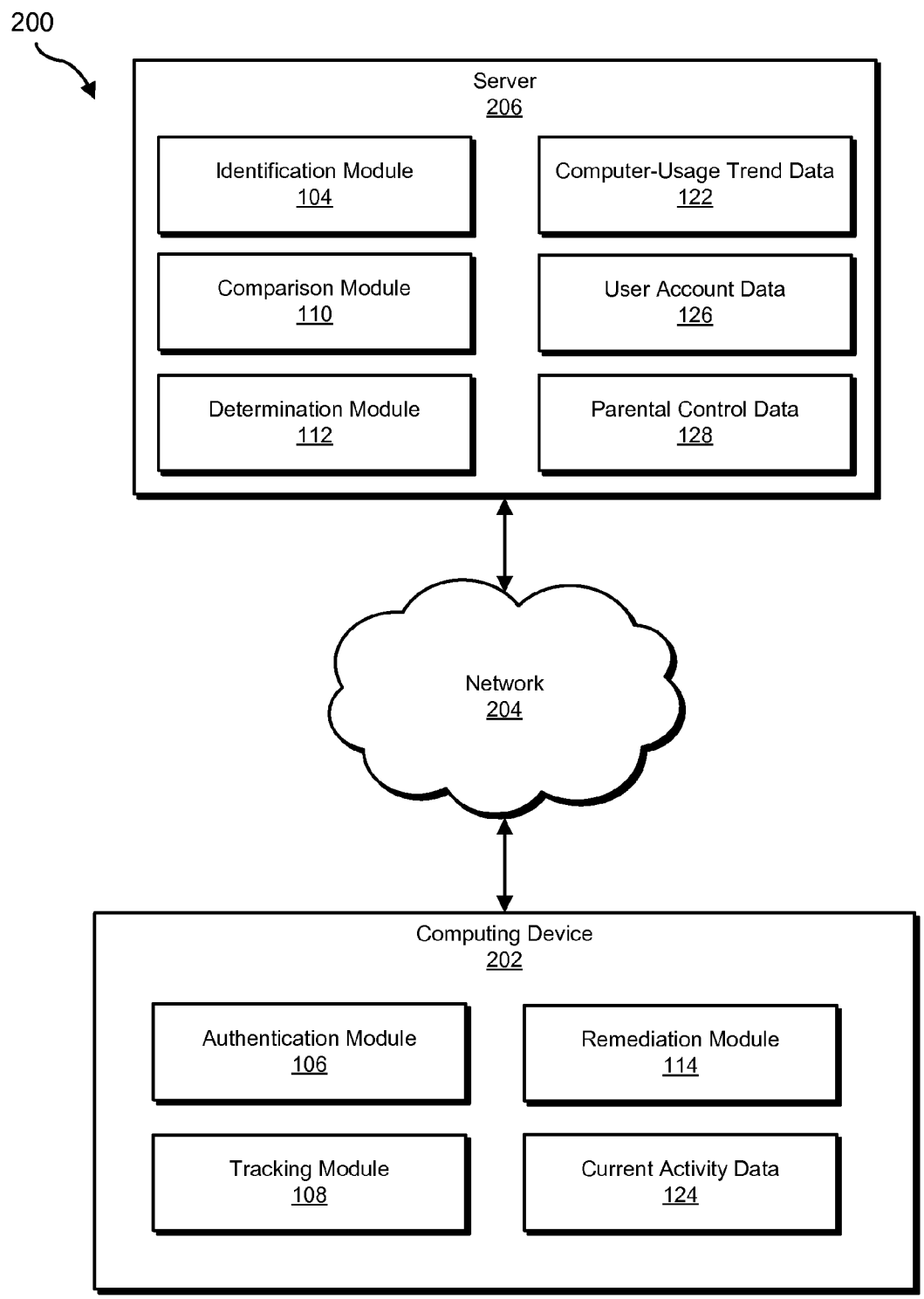
FIG. 2 is a block diagram of an exemplary system for performing authentication validation.

The following will provide, with reference to FIGS. 1-2, detailed descriptions of exemplary systems for performing authentication validation. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for performing authentication validation. As illustrated in this figure, exemplary system 100 may include one or more modules 102 for performing one or more tasks. For example, and as will be explained in greater detail below, exemplary system 100 may include 1) an identification module 104 programmed to identify a computer-usage trend of a first user that reflects a history of computer-related activities engaged in by the first user, 2) an authentication module 106 programmed to determine that a current user is logged into a computing system under a user account of the first user, 3) a tracking module 108 programmed to track activities of the current user while the current user is logged into the computing system as the first user, 4) a comparison module 110 programmed to compare the tracked activities of the current user with the computer-usage trend of the first user, 5) a determination module 112 programmed to determine that the tracked activities of the current user do not correspond to the computer-usage trend of the first user, and 6) a remediation module 114 programmed to, in response to determining that the tracked activities of the current user do not correspond to the computer-usage trend of the first user, perform at least one remedial action.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store computer-usage trend data 122, current activity data 124, user account data 126, and/or parental control data 128.

Database 120 may represent portions of a single database or computing device or a plurality of databases or computing devices. For example, database 120 may represent a portion of server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include a computing device 202 in communication with a server 206 via a network 204.

In one embodiment, one or more of modules 102 from FIG. 1 may, when executed by at least one processor of computing device 202, enable computing device 202 to performing authentication validation. For example, and as will be described in greater detail below, computing device 202 may include authentication module 106 and tracking module 108. Computing device 202 may also include remediation module 114 and current activity data 124.

In the example shown in FIG. 2 computing device 202 may communicate and coordinate with remote systems (e.g., server 206, which may represent a server of a security-software provider or other cloud-based service). Server 206 may include identification module 104, comparison module 110, determination module 112, computer-usage trend data 122, user account data 126, and/or parental control data 128.

While FIG. 2 shows modules and data of system 100 divided between computing device 202 and server 206 in a particular configuration, the modules and data from FIG. 1 may be distributed between local devices (e.g., computing device 202) and remote devices (e.g., server 206) in any other suitable manner. Alternatively, all of the modules and data from FIG. 1 may be local to computing device 202 or located remotely at server 206.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Server 206 generally represents any type or form of computing device that is capable of providing and/or facilitating authentication validation and/or parental-control enforcement. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections.

Figure 3:
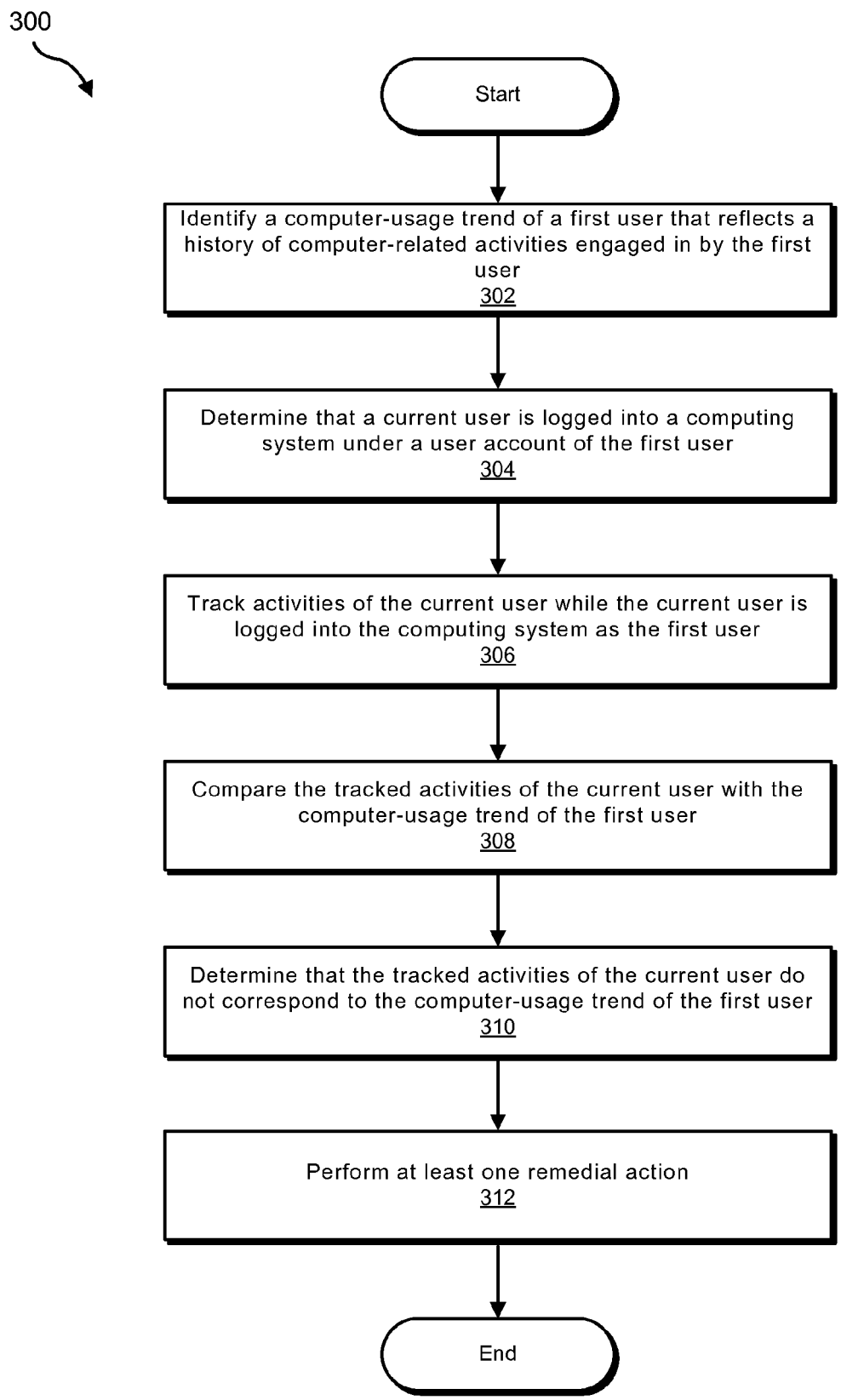
FIG. 3 is a flow diagram of an exemplary method for performing authentication validation.

FIG. 3 is a flow diagram of an exemplary computer-implemented method 300 for performing authentication validation. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

At step 302 in FIG. 3, one more of the systems described herein may identify a computer-usage trend of a first user that reflects a history of computer-related activities engaged in by the first user. For example, identification module 104 may, as part of server 206 in FIG. 2, identify a computer-usage trend of a user of computing device 202 that reflects a history of computer-related activities engaged in by a user of computing device 202.

As used herein, the phrase "computer-usage trend" generally refers to any set of one or more historical activities performed on a computer by a user. For example, a computer-usage trend may reflect the habits of a user on a single computing device and/or multiple computing devices over a period of time. A computer-usage trend may indicate websites a user visits (e.g., by category, by individual website, etc.), how long a user spends visiting each website and/or surfing the web, the programs a user accesses (e.g., instant messenger, games, email, productivity software, media playback software, etc.), how long a user actively interacts with each program, the types of input used by a user (e.g., keyboard, mouse, webcam, etc.), how fast a user types, the total length of time a user is active, typical locations of computer usage (e.g., based on GPS data), and/or any other information about a user's computer activities.

In some embodiments, a computer-usage trend may be updated over time to reflect a user's changing computer habits and activities. A computer-usage trend may reflect a user's activities on a single system (e.g., a personal computer, a laptop, a smartphone, a tablet device, a web-based service or system, etc.). Alternatively, a computer-usage trend may reflect a user's activities on multiple systems and/or services.

Identification module 104 may identify a computer-usage trend of a user in a variety of ways. For example, identification module 104 may track activities of a user over time and then analyze the tracked activities to create the computer-usage trend. For example, identification module 104 may identify activities that are often or typically performed by a user on a computing device. In some embodiments, identification module 104 may rank the activities in order of most frequently performed to least frequently performed. Additionally or alternatively, identification module 104 may rank the activities of the user from those the user engages in for the most amount of time to those the user engages in for the least amount of time. Identification module 104 may also use any other suitable heuristic or algorithm to organization, analyze, and/or compile computer-usage information to establish a computer-usage trend.

Identification module 104 may identify a computer-usage trend from one or more of a variety of locations. For example, identification module 104 may identify a computer-usage trend that is tracked by another system, stored in the cloud, or stored locally. In other embodiments, identification module 104 may aggregate usage data from multiple systems and/or services to establish a usage trend for a user.

At step 304 in FIG. 3, one or more of the systems described herein may determine that a current user is logged into the computing system under a user account of the first user. For example, authentication module 106 (which may, as detailed above, be part of computing device 202 in FIG. 2) may determine that a current user is logged into computing system 202 under a user account of the first user.

Authentication module 106 may determine that a current user is logged into the computing system under the user account of the first user in any suitable manner. In some embodiments, authentication module 106 may be part of an authentication mechanism for computing device 202, a cloud-based service, and/or any other system for which the first user has an account, and may detect authentication as part of the authentication mechanism.

Authentication module 106 may determine that the user is logged into the computing system by detecting an authentication process, by detecting computing activity being performed under the first user's account, by querying an authentication mechanism, and/or in any other suitable manner.

Authentication module 106 may determine that the current user is logged into the computing system in a variety of contexts. For example, authentication module 106 may determine the current user is logged on to a computing device, such as a personal computer, laptop, a cellular telephone, and/or any other local device or endpoint. Alternatively, authentication module 106 may determine that a current user is logged into a remote computing system, such as a network or cloud-based service or system that involves user authentication.

At step 306 in FIG. 3, one or more of the systems described herein may track activities of the current user while the current user is logged into the computing system as the first user. For example, tracking module 108 (which may, as detailed above, form part of computing device 202 in FIG. 2) may track activities of a user of computing device 202 while the user is logged into computing device 202 as the first user (e.g., under the first user's account).

Tracking module 108 may track activities of the current user in any suitable manner. For example, tracking module 108 may monitor the websites accessed by a user, may identify programs accessed by the user, may determine how long a user spends performing each activity on a computing system, may monitor input devices of a user (e.g., mouse, keyboard, game controllers, USB devices, etc.), and/or may track various other activities (e.g., activities described above in the explanation of computer-usage trends) in any suitable manner.

At step 308 in FIG. 3, one more of the systems described herein may compare the tracked activities of the current user with the computer-usage trend of the first user. For example, comparison module 110 (which may, as detailed above be part of server 206 in FIG. 2) may compare the tracked activities of a current user of computing device 202 with the computer-usage trend of a first user.

Comparison module 110 may compare activities of a current user with a computer-usage trend of a first user in one or more of a variety of ways. For example, in some embodiments comparison module 110 may compare programs accessed by the current user to programs accessed by the first user, may compare the amount of time the current user spends surfing the web to the amount of the first user spends surfing the web, may compare websites visited by the current user with websites visited by the first user, may compare the typing speed of the current user with the typing speed of the first user, may compare games played by the current user with games played by the first user, and/or may compare tracked activities of the current user with tracked activities of first user (as identified in the first user's computer-usage trend) in any other suitable manner.

Comparison module 110 may use any suitable algorithm or heuristic to compare activities of the current user to the computer-usage trend of the first user. In some embodiments, comparison module 110 may compare all activities of the current user to the computer-usage trend of the first user. Alternatively, comparison module 110 may compare a subset of the activities of the current user to the computer-usage trend of the first user. For example, comparison module 110 may compare only the most frequently performed activities of the current user and/or the activities the current user spends the most time engaged in to the computer-usage trend of the first user.

At step 310 in FIG. 3, one or more of the systems described herein may determine that the tracked activities of the current user do not correspond to the computer-usage trend of the first user. For example, determination module 112 (which may, as detailed above, be part of server 206 in FIG. 2) may determine that tracked activities of the current user do not correspond to tracked activities identified in the computer-usage trend of the first user.

Determination module 112 may determine that the tracked activities of the current user do not correspond to the computer-usage trend of the first user in various ways. For example, determination module 112 may determine that the current user is involved in substantially different activities than the first user typically is involved in. Determination module 112 may also determine that tracked activities of the current user do not correspond with the computer-usage trend of the first user by determining a distance between the tracked activities of current user and the computer-usage trend of the first user. If the distance is greater than a predetermined threshold, then determination module 112 may determine that the tracked activities of the current user do not correspond to the computer-usage trend of the first user. For example, if determination module 112 determines that the current user visits more than a predetermined number of websites that have not been visited by the first user, determination module 112 may determine that the tracked activities of the current user do not correspond to the computer-usage trend of the first user. In another example, determination module 112 may determine that if a current user spends more than a predetermined percentage of time playing games than a first user (e.g., if the current user is a child and the first user is a parent), determination module 112 may determine that the activities of the current user and the first user do not correspond. As another example, determination module 112 may determine that a current user is much more active (or less active) than the first user and as a result may decide that the activities of the current user do not correspond to the activities of the first user.

Determination module 112 may also use any other suitable algorithm or heuristic to determine whether the activities of the current user correspond to the computer-usage trend of the first user. For example, determination module 112 may perform a statistical analysis on the activities of the current user and the computer-usage trend of the first user to determine the variance between activities of the current user and the first user. If the variance is greater than a predetermined threshold, determination module 112 may determine that the activities do not correspond to the computer-usage trend of the first user.

In some embodiments, determination module 112 may determine whether the activities of the current user correspond to the computer-usage trend of the first user in real time. For example, determination module 112 may analyze and compare the activities of the current user as they occur. In other embodiments, determination module 112 may analyze data collected during a session of the current user at some point in time after the current user performs the actions (e.g., after the current user logs off the computing system, once a day, once a week, etc).

At step 312 in FIG. 3, one or more of the systems described herein may, in response to determining that the tracked activities of the current user do not correspond to the computer-usage trend of the first user, perform at least one remedial action. For example, remediation module 114 (which may, as detailed above, be part of computing device 202 in FIG. 2) may perform at least one remedial action.

Remediation module 114 may perform one or more of any of a variety of remedial actions. Remediation module 114 may log the current user off the first user's account, may lock the current user out of a computing system, may switch parental-control parameters, may report usage discrepancies to a parent or other administrator, may automatically associate a log of the activities of the current user with a different user account, and/or may perform any other suitable remediation action.

In one example of the process described in FIG. 3, the systems described herein may identify computer-usage trends of a number of users (e.g., kids) of a computing device or system. For example, identification module 104 may identify a computer-usage trend of a second user that reflects a history of computer-related activities engaged in by the second user (e.g., the second user may be a sibling, parent, or friend of the first user). In such embodiments, comparing the tracked activities of the current user with the computer-usage trend of the second user may include determining that the tracked activities of the current user do not correspond to the computer-usage trend of the first user by determining that the tracked activities of the current user correspond more closely to the computer-usage trend of the second user than the computer-usage trend of the first user. For example, determination module 112 may determine that the current user is visiting a set of websites that are not typically visited by the first user but are often visited by the second user.

Continuing with the previous example, before remedial action is performed, the tracked activities of the current user may be associated with the user account of the first user. However, after determination module 112 determines that the tracked activities correspond more closely to the computer-usage trend of the second user than the first user, remediation module 114 may automatically disassociate the tracked activities of the current user from the user account of the first user and associate the tracked activities of the current user with the user account of the second user. In such embodiments, identifying the computer-usage trend of the first user may include tracking activities of the first user while the first user is logged into the first user account and analyzing the tracked activities in the first user account to create the computer-usage trend of the first user. Similarly, identifying the computer-usage trend of the second user may include tracking activities of the second user while the second user is logged into the second user account and analyzing the tracked activities of the second user account to create the computer-usage trend of the second user. Thus, associating the tracked activities of the current user with the user account of the second user may include analyzing the tracked activities of the current user and updating the computer-usage trend of the second user to reflect the tracked activities of the current user. In this manner, a user's computer-usage trend may become more accurate and useful over time.

Turning to another example, determining that the tracked activities of the current user correspond more closely to the computer-usage trend of the second user than the computer usage of the first user may include determining that the tracked activities of the current user correspond to activities that are often engaged in by the second user and are not engaged in by the first user. For example, determination module 112 may determine that the current user spends most of his time on Facebook, which corresponds to activities of the second user. In contrast, the first user may spend most of his time using productivity software. In this situation, remediation module 114 may automatically disassociate tracked activities of the current user from a user account of the first user and may associate the tracked activities of the current user with a user account of the second user. Alternatively, remediation module 114 may prompt an administrator (e.g., a parent) to review the current user's activity and determine whether the activity should be associated with a user other than the first user.

As previously noted, remediation module 114 may perform a remedial action by changing parental-control settings associated with a user. For example, before method 300 is performed, a set of liberal parental controls that correspond to the first user account (e.g., an account of an older child) may be applied to the activities of the current user. If determination module 112 determines that the activities of the current user correspond more closely to a second user (e.g., a younger user) than the first user, remediation module 114 may switch to more restrictive parental controls associated with an account of the second user (and/or may automatically log the current user out of the first user's account and into the second user's account).

While not shown in FIG. 3, in some embodiments the data collected and analyzed in method 300 may be used by a parent, administrator, or automated system to configure parental-control software. For example, a parent may install a new parental-control software program and may create a generic user account that a child is allowed to use. Tracking module 108 may track the activities of the child under the generic user account and may use a previously-created computer-usage trend of the child to identify the child, import bookmarks, settings, and/or other policy data (e.g., parental controls) associated with the child, and bind the imported data to the generic user account to create a personalized account for the child.

Figure 4:
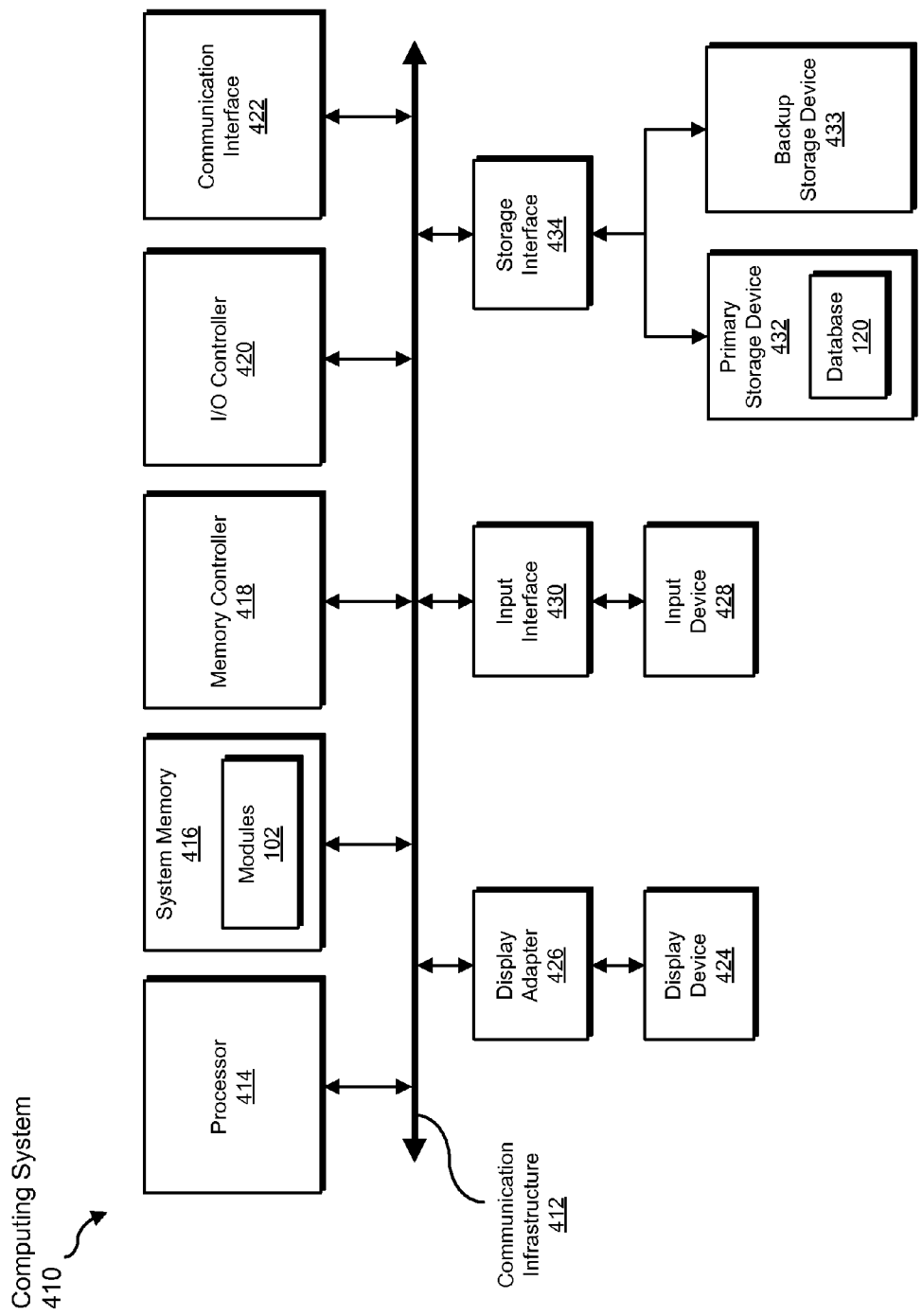
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the identifying, determining, tracking, comparing, performing, and associating steps described herein. All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 410. All or a portion of the computer program stored on the computer-readable-storage medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
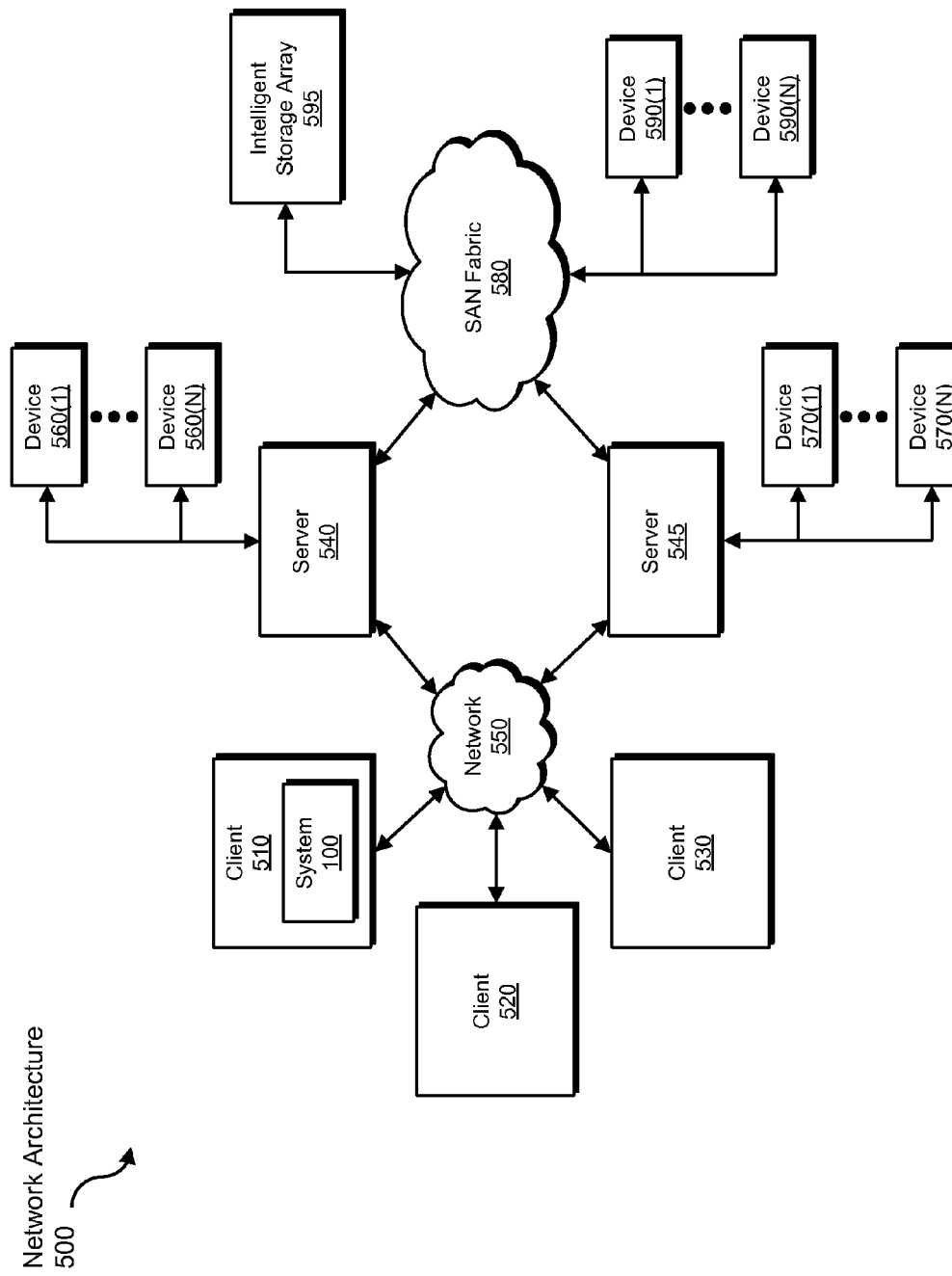
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the identifying, determining, tracking, comparing, performing, and associating steps disclosed herein. All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for performing authentication validation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system by performing remedial actions to correctly associate tracked computer-related activities with users.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing authentication validation, at least a portion of the method being performed by at least one hardware processor of a computing system, the method comprising:
    identifying a computer-usage trend of a first user that reflects a history of computer-related activities engaged in by the first user, the computer-usage trend indicating at least one software program and/or website accessed by the first user;
    determining that a current user is logged into a computing device under a user account of the first user;
    tracking activities of the current user on the computing device while the current user is logged into the computing system as the first user;
    comparing the tracked activities of the current user with the computer-usage trend of the first user;
    determining that the tracked activities of the current user do not correspond to the computer-usage trend of the first user;
    in response to determining that the tracked activities of the current user do not correspond to the computer-usage trend of the first user, switching from parental controls associated with an account of the first user to more restrictive parental controls that are associated with an account of the current user by automatically logging the current user out of the account of the first user and into the computing device under the account of the current user.

2. The computer-implemented method of claim 1, further comprising:
    identifying a computer-usage trend of a second user that reflects a history of computer-related activities engaged in by the second user;
    comparing the tracked activities of the current user with the computer-usage trend of the second user, wherein determining that the tracked activities of the current user do not correspond to the computer-usage trend of the first user comprises determining that the tracked activities of the current user correspond more closely to the computer-usage trend of the second user than the computer-usage trend of the first user.

3. The computer-implemented method of claim 2, wherein:
    before logging the current user out of the account of the first user, the tracked activities of the current user are associated with the user account of the first user;
    logging the current user into the computing device under the account of the current user comprises automatically disassociating the tracked activities of the current user from the user account of the first user and associating the tracked activities of the current user with a user account of the second user.

4. The computer-implemented method of claim 3, wherein:
    identifying the computer-usage trend of the first user comprises tracking activities of the first user while the first user is logged into the user account of the first user and analyzing the tracked activities of the user account of the first user to create the computer-usage trend of the first user;
    identifying the computer-usage trend of the second user comprises tracking activities of the second user while the second user is logged into the user account of the second user and analyzing the tracked activities of the user account of the second user to create the computer-usage trend of the second user.

5. The computer-implemented method of claim 4, wherein:
    associating the tracked activities of the current user with the user account of the second user comprises analyzing the tracked activities of the current user and updating the computer-usage trend of the second user to reflect the tracked activities of the current user.

6. The computer-implemented method of claim 2, wherein determining that the tracked activities of the current user correspond more closely to the computer-usage trend of the second user than the computer-usage trend of the first user comprises determining that the tracked activities of the current user correspond to activities that are often engaged in by the second user and are not often engaged in by the first user.

7. The computer-implemented method of claim 1, wherein tracking activities of the current user on the computing device comprises aggregating usage data from a plurality of computing devices.

8. The computer-implemented method of claim 1, wherein determining that the tracked activities of the current user do not correspond to the computer-usage trend of the first user comprises:
    determining a distance between the computer-usage trend of the first user and the tracked activities of the current user;
    determining that the distance is greater than a predetermined threshold.

9. The computer-implemented method of claim 1, wherein the computer-usage trend indicates the website accessed by the first user by indicating a category of websites visited by the first user.

10. The computer-implemented method of claim 1, wherein the computer-usage trend indicates how long the first user interacts with the at least one software program.

11. A system for performing authentication validation, the system comprising:
    an identification module programmed to identify a computer-usage trend of a first user that reflects a history of computer-related activities engaged in by the first user, the computer-usage trend indicating at least one software program and/or website accessed by the first user;
    an authentication module programmed to determine that a current user is logged into a computing device under a user account of the first user;
    a tracking module programmed to track activities of the current user on the computing device while the current user is logged into the computing device as the first user;

a comparison module programmed to compare the tracked activities of the current user with the computer-usage trend of the first user;

a determination module programmed to determine that the tracked activities of the current user do not correspond to the computer-usage trend of the first user;

a remediation module programmed to, in response to determining that the tracked activities of the current user do not correspond to the computer-usage trend of the first user, switch from parental controls associated with an account of the first user to more restrictive parental controls that are associated with an account of the current user by automatically logging the current user out of the account of the first user and into the computing device under the account of the current user;

at least one hardware processor configured to execute the identification module, the authentication module, the tracking module, the comparison module, the determination module, and the remediation module.

12. The system of claim 11, wherein:

the identification module is further programmed to identify a computer-usage trend of a second user that reflects a history of computer-related activities engaged in by the second user;

the comparison module is programmed to compare the tracked activities of the current user with the computer-usage trend of the second user, wherein determining that the tracked activities of the current user do not correspond to the computer-usage trend of the first user comprises determining that the tracked activities of the current user correspond more closely to the computer-usage trend of the second user than the computer-usage trend of the first user.

13. The system of claim 12, wherein:

before logging the current user out of the account of the first user, the tracking module associates the tracked activities of the current user with the user account of the first user;

the remediation module automatically disassociates the tracked activities of the current user from the user account of the first user and associates the tracked activities of the current user with a user account of the second user.

14. The system of claim 13, wherein:

the identification module identifies the computer-usage trend of the first user by tracking activities of the first user while the first user is logged into the user account of the first user and analyzing the tracked activities of the user account of the first user to create the computer-usage trend of the first user;

the identification module identifies the computer-usage trend of the second user by tracking activities of the second user while the second user is logged into the user account of the second user and analyzing the tracked activities of the user account of the second user to create the computer-usage trend of the second user.

15. The system of claim 14, wherein:

the identification module associates the tracked activities of the current user with the user account of the second user by analyzing the tracked activities of the current user and updating the computer-usage trend of the second user to reflect the tracked activities of the current user.

16. The system of claim 12, wherein the determination module is programmed to determine that the tracked activities of the current user correspond more closely to the computer-usage trend of the second user than the computer-usage trend of the first user by determining that the tracked activities of the current user correspond to activities that are often engaged in by the second user and are not often engaged in by the first user.

17. The system of claim 11, wherein the tracking module is programmed to track activities of the current user on the computing device by aggregating usage data from a plurality of computing devices.

18. The system of claim 11, wherein the determination module is programmed to determine that the tracked activities of the current user do not correspond to the computer-usage trend of the first user by:

determining a distance between the computer-usage trend of the first user and the tracked activities of the current user;

determining that the distance is greater than a predetermined threshold.

19. The system of claim 11, wherein the computer-usage trend indicates one or more typical locations where the first user uses the computing system.

20. A non-transitory computer-readable-storage medium comprising one or more computer-executable instructions that, when executed by at least one processor of a computing device, cause the computing device to:

identify a computer-usage trend of a first user that reflects a history of computer-related activities engaged in by the first user, the computer-usage trend indicating at least one software program and/or website accessed by the first user;

determine that a current user is logged into a computing device under a user account of the first user;

track activities of the current user on the computing device while the current user is logged into the computing device as the first user;

compare the tracked activities of the current user with the computer-usage trend of the first user;

determine that the tracked activities of the current user do not correspond to the computer-usage trend of the first user;

in response to determining that the tracked activities of the current user do not correspond to the computer-usage trend of the first user, switch from parental controls associated with an account of the first user to more restrictive parental controls that are associated with an account of the current user by automatically logging the current user out of the account of the first user and into the computing device under the account of the current user.

* * * * *